United States Patent
Murakami et al.

(10) Patent No.: US 7,554,720 B2
(45) Date of Patent: Jun. 30, 2009

(54) OPTICAL TRANSMISSION APPARATUS WITH AUTOMATIC GAIN CONTROL AND AUTOMATIC LEVEL CONTROL MODE SELECTION

(75) Inventors: Yuki Murakami, Kawasaki (JP); Hideaki Sugiya, Kawasaki (JP); Akira Yamamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/407,170

(22) Filed: Apr. 20, 2006

(65) Prior Publication Data

US 2007/0121195 A1    May 31, 2007

(30) Foreign Application Priority Data

Nov. 28, 2005 (JP) ............................. 2005-341314

(51) Int. Cl.
*H04B 10/17* (2006.01)
*H04B 10/12* (2006.01)

(52) U.S. Cl. .............................. 359/341.41; 359/341.42
(58) Field of Classification Search ................................. 359/341.41–341.42
See application file for complete search history.

(56) References Cited

U.S. PATENT DOCUMENTS

| | | | |
|---|---|---|---|
| 5,805,322 A | | 9/1998 | Tomofuji |
| 5,995,274 A | * | 11/1999 | Sugaya et al. ............... 359/337 |
| 6,025,947 A | * | 2/2000 | Sugaya et al. ................. 398/97 |
| 6,038,063 A | * | 3/2000 | Tsuda et al. ........... 359/341.41 |
| 6,144,485 A | * | 11/2000 | Sugaya et al. ............... 359/337 |
| 6,198,572 B1 | * | 3/2001 | Sugaya et al. ............... 359/337 |
| 6,292,289 B1 | * | 9/2001 | Sugaya et al. ............... 359/337 |
| 6,348,987 B1 | | 2/2002 | Tomofuji |
| 6,600,584 B2 | | 7/2003 | Tomofuji |
| 2002/0048062 A1 | * | 4/2002 | Sakamoto et al. ........... 359/124 |
| 2002/0093705 A1 | * | 7/2002 | Okano et al. ................ 359/124 |
| 2004/0001712 A1 | | 1/2004 | Tomofuji |
| 2004/0027651 A1 | * | 2/2004 | Balland et al. ......... 359/341.41 |
| 2005/0270635 A1 | * | 12/2005 | Shukunami et al. ......... 359/337 |

FOREIGN PATENT DOCUMENTS

| | | |
|---|---|---|
| JP | 08-195733 A | 7/1996 |
| JP | 2000-236301 A | 8/2000 |

* cited by examiner

*Primary Examiner*—Eric Bolda
(74) *Attorney, Agent, or Firm*—Hanify & King, P.C.

(57) ABSTRACT

A transmission apparatus designed to be capable of monitoring faults which occur between the input stage of an optical multiplexer and the input stage of an optical amplifier, appropriately switching between automatic gain control and automatic level control, and outputting signal lights with appropriate optical power, without using a spectrum analyzer. The optical multiplexer combines the wavelengths of a plurality of signal lights. The optical amplifier is connected at the latter stage of the optical multiplexer, and operates in the automatic gain control mode or in the automatic level control mode, the automatic gain control mode maintaining a constant gain for wavelength-multiplexed signal light, the automatic level control mode maintaining constant output power for the wavelength-multiplexed signal light. A mode selector selects the automatic gain control mode or the automatic level control mode for the optical amplifier based on the total optical power of the plurality of signal lights to be input to the optical multiplexer and the optical power of the wavelength-multiplexed signal light to be input to the optical amplifier.

10 Claims, 9 Drawing Sheets

OPTICAL TRANSMISSION APPARATUS WITH AUTOMATIC GAIN CONTROL AND AUTOMATIC LEVEL CONTROL MODE SELECTION

CROSS-REFERENCE TO RELATED APPLICATIONS

This application is based upon and claims the benefits of priority from the prior Japanese Patent Application No. 2005-341314, filed on Nov. 28, 2005, the entire contents of which are incorporated herein by reference.

BACKGROUND OF THE INVENTION (1) Field of the Invention

This invention relates to a transmission apparatus and, more particularly, to a transmission apparatus for multiplexing and transmitting signal lights.

(2) Description of the Related Art

One of methods for realizing a large-capacity optical communication system is a communication method employing Wavelength Division Multiplexing (WDM) technology. This WDM technology is expected to offer flexible system operation and reliable circuit quality, for example, to cope with a system which is dynamically established by changing the number of operating wavelengths (the number of signal lights to be input to the system) or switching an optical path.

Some optical amplifiers that are used in the WDM technology operate in two operation modes: Automatic Gain Control (AGC) mode and Automatic Level Control (ALC) mode. In AGC mode, the optical amplifiers maintain their constant gains over signal lights of certain input wavelengths. In the ALC mode, the optical amplifiers maintain their output power according to the number of operating wavelengths. The optical amplifiers generally operate in ALC mode, and if the number of operating wavelengths varies, the ALC mode is switched to the AGC mode. As a result, stable optical communication can be performed even if the number of wavelengths changes (for example, refer to Japanese Unexamined Patent Publications Nos. 2000-236301 and 8-195733).

FIG. 8 is a block diagram of a conventional optical communication system. As shown in this figure, this optical communication system comprises a transmitting station 110, a repeater 120, and a receiving station 130, for example. The transmitting station 110 combines the wavelengths of signal lights from optical senders (which are represented by OS in the figure) 101 to 103, and amplifies and outputs the wavelength-multiplexed signal light to the repeater 120. The repeater 120 amplifies the received signal light to compensate for attenuation caused through a transmission path from the transmitting station 110, and outputs the resultant to the receiving station 130. The receiving station 130 amplifies the received signal light to compensate for attenuation caused though a transmission path from the repeater 120, separates the resulting signal light by wavelength, and outputs them to optical receivers (which are represented by OR in the figure) 141 to 143.

The transmitting station 110 has an optical multiplexer 111, couplers 112 and 116, a spectrum analyzer 113, an optical amplifier 114, and a monitoring/control unit 115. Signal lights output from the optical senders 101 to 103 enter the optical multiplexer 111. The optical multiplexer 111 then combines the wavelengths of the signal lights and outputs the wavelength-multiplexed signal light to the spectrum analyzer 113 and the optical amplifier 114 via the coupler 112.

The spectrum analyzer 113 separates by wavelength the wavelength-multiplexed signal light, which is output from the optical multiplexer 111, and calculates optical power for each wavelength. Then the spectrum analyzer 113 calculates the number of operating wavelengths (the number of signal lights existing in the transmitting station 110) based on the detected wavelengths and their optical power. The spectrum analyzer 113 gives the calculated number of operating wavelengths to the optical amplifier 114 and the monitoring/control unit 115.

The optical amplifier 114 processes the signal light in AGC or ALC mode, depending on the number of operating wavelengths given from the spectrum analyzer 113. The optical amplifier 114 generally operates in ALC mode so as to output signal light with constant optical power according to the number of operating wavelengths. If the number of operating wavelengths changes due to addition or removal of optical senders 101 to 103, the optical amplifier 114 operates in AGC mode. In addition, the optical amplifier 114 also operates in AGC mode if the number of operating wavelengths for multiplexed signal light output from the optical multiplexer 111 varies due to a fault occurring in the optical multiplexer 111.

The monitoring/control unit 115 transmits a monitoring control signal OSC including the number of operating wavelengths to the repeater 120 and the receiving station 130, the number of operating wavelengths given from the spectrum analyzer 113. The repeater 120 and the receiving station 130 should be notified of the number of operating wavelengths because they do not have a spectrum analyzer. In addition, the monitoring/control unit 115 communicates with the optical amplifier 114 to monitor and control operations of the optical amplifier 114.

The repeater 120 has couplers 121 and 124, an optical amplifier 122 and a monitoring/control unit 123. The signal light output from the transmitting station 110 enters the optical amplifier 122 via the coupler 121. The monitoring control signal OSC output from the transmitting station 110 enters the monitoring/control unit 123 via the coupler 121. The monitoring/control unit 123 extracts the number of operating wavelengths from the monitoring control signal OSC, and gives it to the optical amplifier 122 and the coupler 124. The optical amplifier 122 processes the signal light in AGC or ALC mode, depending on the number of operating wavelengths given from the monitoring/control unit 123. Note that the optical amplifier 122 switches between the AGC mode and the ALC mode under the same conditions as the optical amplifier 114.

The receiving station 130 has a coupler 131, an optical amplifier 132, a monitoring/control unit 133 and an optical demultiplexer 134. The signal light output from the repeater 120 enters the optical amplifier 132 via the coupler 131. The monitoring control signal OSC output from the repeater 120 enters the monitoring/control unit 133 via the coupler 131. The monitoring/control unit 133 extracts the number of operating wavelengths from the monitoring control signal OSC and gives it to the optical amplifier 132. The optical amplifier 132 processes the signal light in AGC or ALC mode, depending on the number of operating wavelengths given from the monitoring/control unit 133. Note that the optical amplifier 132 switches between the AGC mode and the ALC mode under the same conditions as the optical amplifier 114. The optical demultiplexer 134 separates by wavelength the signal light received from the optical amplifier 132, and outputs them to the optical receivers 141 to 143.

Cost for establishing an optical communication system is a key for Metro, etc. Therefore, there is an optical communication system which realizes optical communication without a spectrum analyzer 113 that is expensive.

FIG. 9 is a block diagram of another conventional optical communication system without a spectrum analyzer. A transmitting station 150 of FIG. 9 does not have a coupler 112 and a spectrum analyzer 113 that the transmitting station 110 of FIG. 8 has, and has couplers 151 to 153 and a power sensor 154. Identical components in FIG. 8 and FIG. 9 have the same reference numerals.

In the optical communication system of FIG. 9, signal lights at the input stage of the optical multiplexer 111 enter the power sensor 154 comprising a photo diode (PD), via the couplers 151 to 153. The power sensor 154 detects the number of signal lights having prescribed optical power or higher, to thereby detect the number of operating wavelengths. The optical amplifier 114 switches between the AGC mode and the ALC mode depending on the number of operating wavelengths detected by the power sensor 154. That is to say, this system does not require a spectrum analyzer 113, thus realizing a simple construction at a low cost.

This technique of obtaining the number of operating wavelengths at the input stage of the optical multiplexer, however, has a drawback in that, since faults which occur between the input stage of the optical multiplexer and the input stage of the optical amplifier are not monitored, the operation modes cannot be switched appropriately for the faults.

For example, in FIG. 9, assume now that signal lights are output from optical senders 101 to 103 and three operating wavelengths are detected by the power sensor 154. In this situation, if a signal path of the optical multiplexer 111 to the optical sender 101 is disconnected and signal light over two wavelengths combined is output from the optical multiplexer 111, the number of wavelengths varies from three to two. In this case, the optical amplifier 114 should operate in AGC mode.

Since the spectrum analyzer 113 separates by wavelength signal light at the input stage of the optical amplifier 114 in order to obtain the number of operating wavelengths, this analyzer 113 can detect the change in the number of wavelengths due to the fault occurring in the optical multiplexer 111. The power sensor 154, however, cannot recognize the change in the number of wavelengths due to the fault occurring in the optical multiplexer 111, so that the optical amplifier 114 cannot switch the operation mode.

SUMMARY OF THE INVENTION

This invention has been made in view of foregoing and intends to provide a transmission apparatus for monitoring faults that occur between the input stage of an optical multiplexer and the input stage of an optical amplifier and appropriately switching between automatic gain control and automatic level control, without a spectrum analyzer.

To achieve this object, there is provided a transmission apparatus for multiplexing and transmitting signal lights. This transmission apparatus comprises: an optical multiplexer for multiplexing the wavelengths of a plurality of signal lights; an optical amplifier being connected at the latter stage of the optical multiplexer for operating in automatic gain control mode or in automatic level control mode, the automatic gain control mode maintaining a constant gain for wavelength-multiplexed signal light, the automatic level control mode maintaining constant output power for the wavelength-multiplexed signal light; and a mode selector for selecting the automatic gain control mode or the automatic level control mode for the optical amplifier based on the total optical power of the plurality of signal lights to be input to the optical multiplexer and the optical power of the wavelength-multiplexed signal light.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of this invention will be described with reference to the accompanying drawings.

Figure 1:
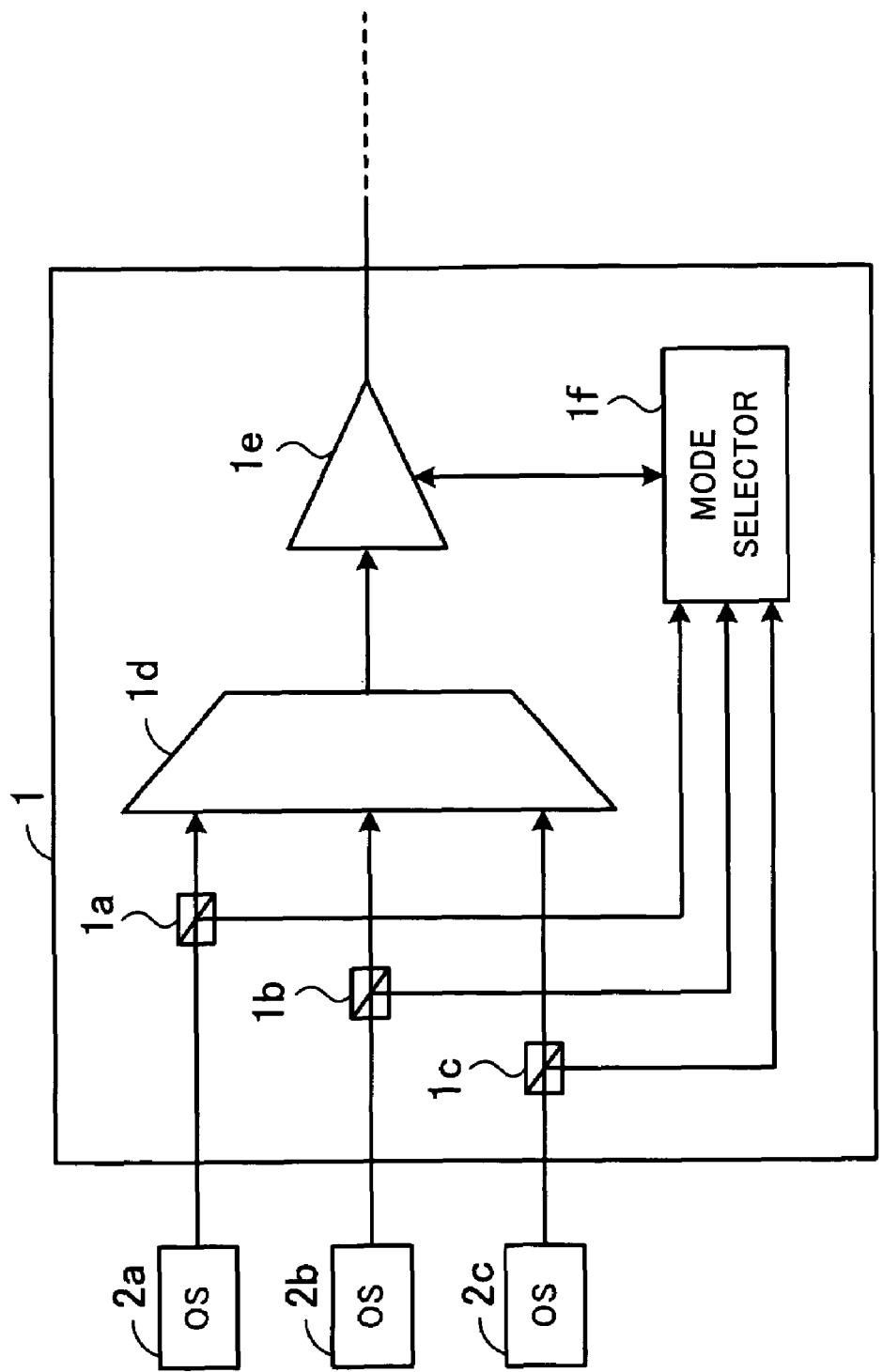
FIG. 1 shows an outline of a transmission apparatus that monitors the optical power at the input and output of an optical multiplexer.

FIG. 1 shows an outline of a transmission apparatus. As shown in this figure, the transmission apparatus 1 has couplers 1a to 1c, an optical multiplexer 1d, an optical amplifier 1e, and a mode selector 1f. The transmission apparatus 1 is connected to optical senders 2a to 2c, and is designed to receive signal lights therefrom. Although not illustrated, a repeater for relaying signal light and a receiving station for receiving the signal light and separating it by wavelength are connected at the latter stage of the transmission apparatus 1, and the signal lights from the optical senders 2a to 2c are finally received by optical receivers being connected to the receiving station.

The optical multiplexer 1d combines the wavelengths of a plurality of signal lights arriving from the optical senders 2a to 2c.

The optical amplifier 1e is connected at the latter stage of the optical multiplexer 1d and is designed to operate in automatic gain control mode or in automatic level control mode, the automatic gain control mode maintaining a constant gain for wavelength-multiplexed signal light, the automatic level control mode maintaining constant output power for the wavelength-multiplexed signal light.

The mode selector 1f receives a plurality of signal lights, which also enter the optical multiplexer 1d, via the couplers 1a to 1c, and calculates the total optical power of the signal lights. The optical amplifier 1e has a monitor for obtaining the optical power of wavelength-multiplexed signal light at its input stage. The mode selector 1f obtains the optical power of the wavelength-multiplexed signal light from this monitor. Instead of the monitor provided in the optical amplifier 1e at the input stage, a monitor for obtaining the optical power of wavelength-multiplexed signal light may be provided at the former stage of the optical amplifier 1e.

The mode selector 1f selects based on the total optical power of the signal lights to be input to the optical multiplexer 1d and the optical power of the wavelength-multiplexed signal light whether the optical amplifier 1e should operate in automatic gain control mode or in automatic level control mode. In a case where the optical multiplexer 1d gets into trouble, the total optical power of signal lights to be input to the optical multiplexer 1d and the optical power of wavelength-multiplexed signal light to be input to the optical amplifier 1e are different. Therefore, the mode selector 1f can select the automatic gain control mode.

As described above, the automatic gain control mode or the automatic level control mode is selected for the optical amplifier 1e based on the total optical power of a plurality of signal lights to be input to the optical multiplexer 1d and the optical power of multiplexed signal light to be input to the optical amplifier 1e. That is to say, faults which occur between the input stage of the optical multiplexer 1d and the input stage of the optical amplifier 1e can be monitored without a spectrum analyzer, thus making it possible to appropriately switch between the automatic gain control and the automatic level control.

The first embodiment is now described in detail with reference to FIGS. 2 and 3.

Figure 2:
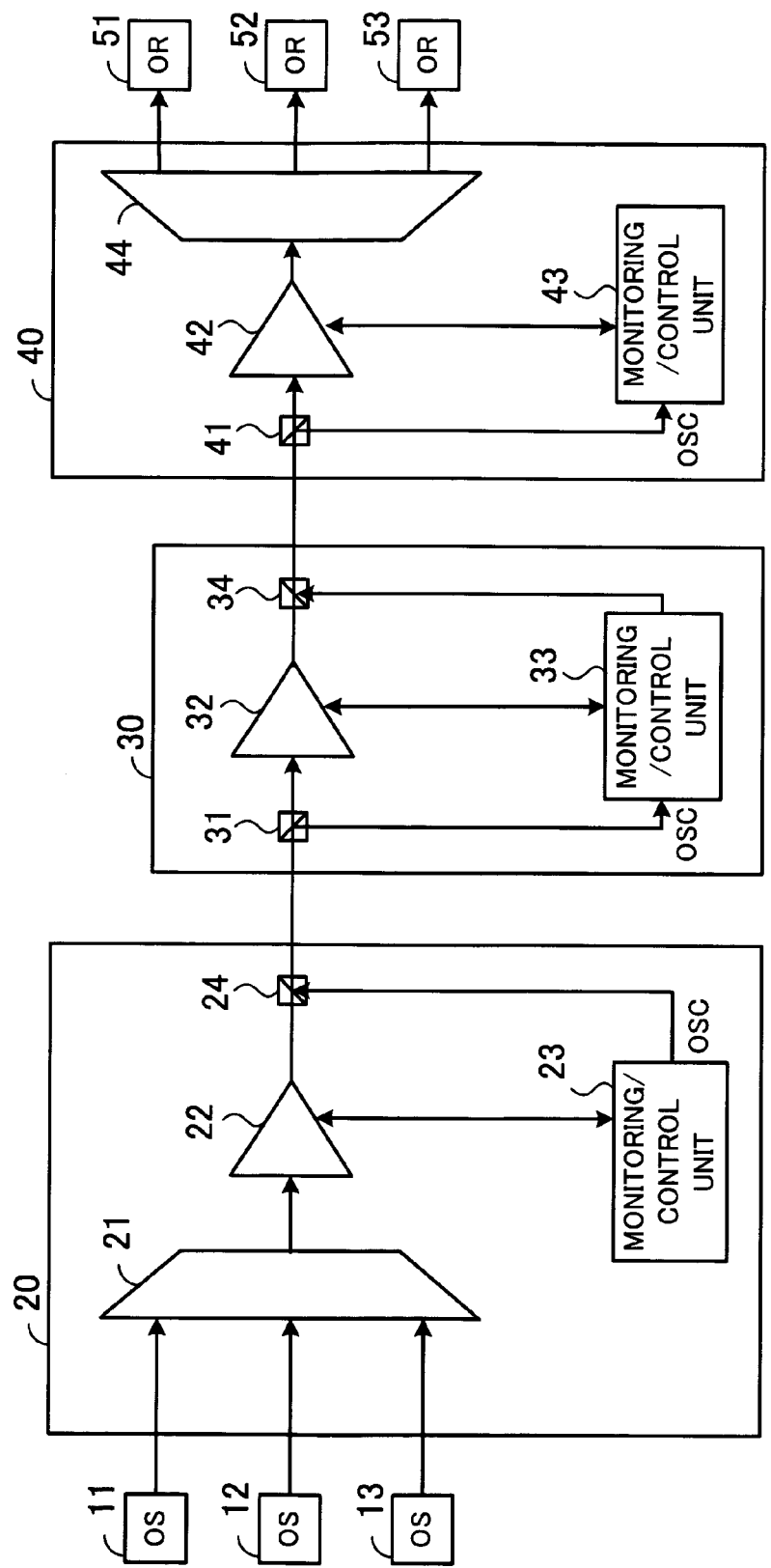
FIG. 2 shows an example of the configuration of an optical communication system according to the first embodiment.

FIG. 2 shows an example of the configuration of an optical communication system according to the first embodiment. Referring to FIG. 2, the optical communication system comprises a transmitting station 20, a repeater 30, and a receiving station 40, for example. The transmitting station 20 combines the wavelengths of signal lights output from optical senders 11 to 13, and amplifies and outputs wavelength-multiplexed signal light to the repeater 30. The repeater 30 amplifies the received signal light to compensate for attenuation caused through a transmission path from the transmitting station 20, and outputs the resultant to the receiving station 40. The receiving station 40 amplifies the received signal light to compensate for attenuation caused through a transmission path from the repeater 30, separates the amplified signal light by wavelength, and outputs them to optical receivers 51 to 53. Some repeaters 30 may be provided between the transmitting station 20 and the receiving station 40.

The transmitting station 20 has an optical multiplexer 21, an optical amplifier 22, a monitoring/control unit 23, and a coupler 24. Signal lights output from the optical senders 11 to 13 enter the optical multiplexer 21. The optical multiplexer 21 combines the wavelengths of the received signal lights and outputs wavelength-multiplexed signal light to the optical amplifier 22.

The optical amplifier 22 processes the received signal light in automatic gain control (AGC) mode or in automatic level control (ALC) mode, depending on a mode selection result given from the monitoring/control unit 23. Now the optical amplifier 22 is described in detail.

Figure 3:
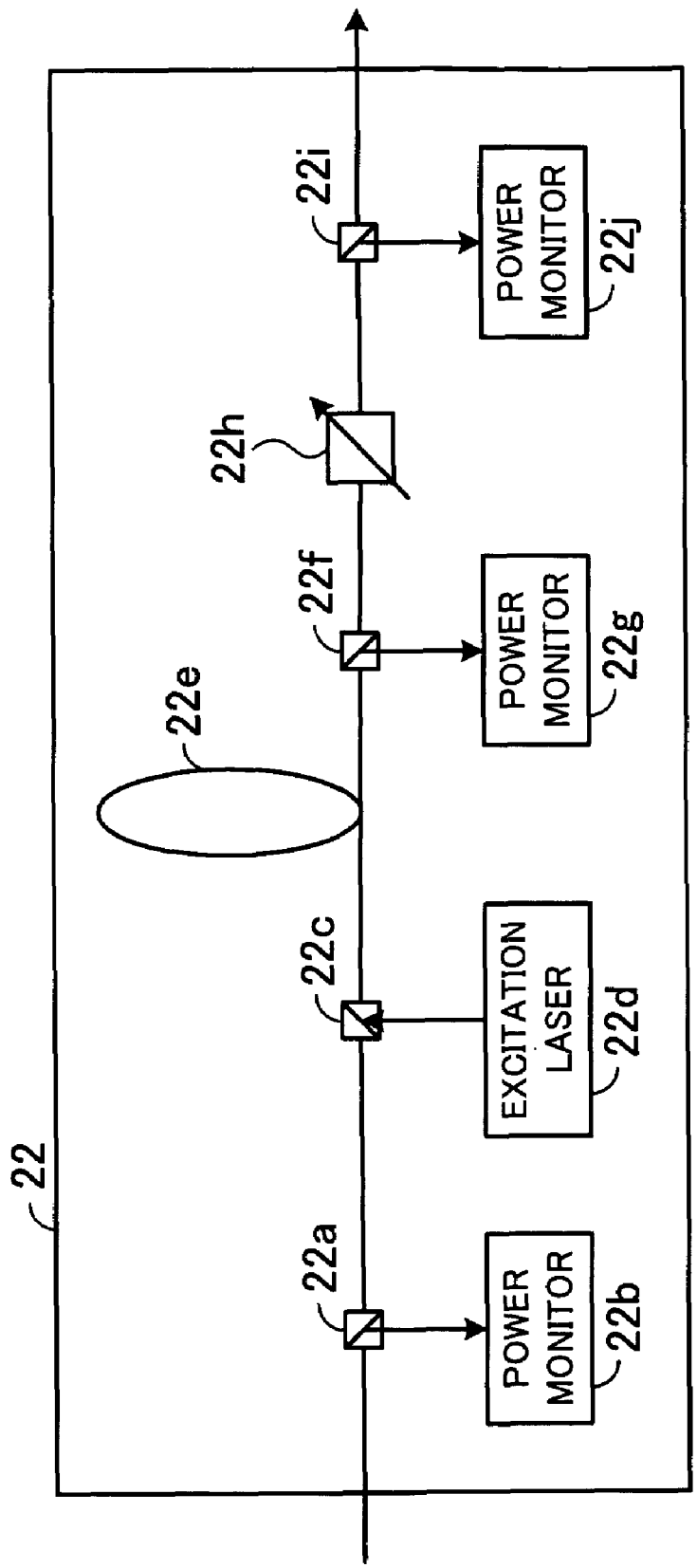
FIG. 3 is a block diagram of the construction of an optical amplifier.

FIG. 3 is a block diagram of the configuration of an optical amplifier. Referring to this figure, the optical amplifier 22 has couplers 22a, 22c, 22f, 22i, power monitors 22b, 22g, 22j, an excitation laser 22d, an Erbium Doped Fiber (EDF) 22e, and a Variable Optical Attenuator (VOA) 22h.

The power monitor 22b monitors the optical power of signal light which is output from the optical multiplexer 21, via the coupler 22a. The excitation laser 22d emits an excitation light to the EDF 22e via the coupler 22c.

The EDF 22e amplifies the signal light with the excitation light emitted from the excitation laser 22d. The EDF 22e is an optical fiber having material ($Er^{3+}$) added thereto, the material being resonance with the bandwidth of the signal light. By receiving the excitation light of a wavelength different from that of the signal light, the EDF 22e forms an inverted population and amplifies the multiplexed signal light by emission of radiation at once.

The power monitor 22g monitors the optical power of the signal light to be input to the VOA 22h, via the coupler 22f. The VOA 22h attenuates the signal light received from the EDF 22e. The power monitor 22j monitors the optical power of the signal light which is output from the VOA 22h, via the coupler 22i.

In order to offer sufficient signal quality, the Wavelength Division Multiplexing (WDM) technology requires such conditions that a prescribed SN ratio or greater and optical power within a prescribed range are obtained in the optical receivers 51 to 53 serving as receiving ends. In addition, optical power in a transmission path for one channel should be controlled at a prescribed level or lower. This is because, if the optical power in the transmission path is very high, signals degrade due to various nonlinear effects. Therefore, the optical amplifier 22 normally operates in ALC mode so as to maintain optical power of signal light constant. On the other hand, the optical amplifier 22 operates in AGC mode when the optical power excessively varies due to increase or decrease in the number of operating wavelengths.

The optical amplifier 22 performs AGC or ALC by controlling excitation light of the excitation laser 22d and the VOA 22h. Further, the optical amplifier 22 monitors its gain for signal light with the power monitors 22b and 22g and also monitors the optical power of signal light to be output with the power monitor 22j. Furthermore, the optical amplifier 22 monitors the amount of attenuation in the VOA 22h with the power monitors 22g and 22j and controls the VOA 22h.

Referring back to FIG. 2, the monitoring/control unit 23 controls the mode switching of the optical amplifier 22 (switching between ALC and AGC). The optical communication system of FIG. 2 uses a predetermined number of operating wavelengths. Based on the predetermined number of operating wavelengths, the monitoring/control unit 23 calculates the total optical power of signal lights to be input to the optical multiplexer 21. Then the monitoring/control unit 23 compares this total optical power with the optical power of multiplexed signal light to be input to the optical amplifier 22, to select the ALC mode or the AGC mode.

A condition for the optical amplifier 22 to operate in AGC mode is represented by the expression (1):

$$|10\ Log(P_{exp})+10\ Log(k)-10\ Log(P_{in})| \geq M \qquad (1)$$

A condition for the optical amplifier 22 to operate in ALC mode is represented by the expression (2):

$$|10\ Log(p_{exp})+10\ Log(k)-10\ Log(P_{in})| < M-\alpha \qquad (2)$$

$p_{exp}$ is expected optical power for one channel to be input to the optical multiplexer 21. k is the number of operating wavelengths which is set in the optical communication system. $P_{in}$ is the optical power of multiplexed signal light to be input to the optical amplifier 22. M is a system margin for detecting change in the number of operating wavelengths. $\alpha$ is hysteresys. In this connection, $p_{exp}$, k, M and $\alpha$ are previously stored in a storage unit, and $P_{in}$ can be obtained by the power monitor 22b of the optical amplifier 22.

With respect to the number of operating wavelengths k, the expected total optical power of signal lights to be input to the optical multiplexer 21 is represented by 10 $Log(p_{exp})$+10 Log(k) (W), which is shown by the first and second terms of the left-hand side of the expression (1), (2). By comparing this expected total optical power with the optical power 10 Log ($P_{in}$), which is shown by the third term of the left-hand side of the expression (1), (2), of multiplexed signal light to be input to the optical amplifier 22, the change in the number of wavelengths between the input stage of the optical multiplexer 21 and the input stage of the optical amplifier 22 can be monitored.

When the absolute value of the obtained differential optical power is equal to or greater than M (satisfies the expression (1)), it is recognized that the preset number of operating wavelengths and the number of wavelengths of the signal light to be input to the optical amplifier 22 are different. Or it is recognized that there are signal lights having expected optical power or higher, or expected optical power or lower. In this case, the optical amplifier 22 operates in AGC mode. When the absolute value of the obtained differential optical power is smaller than M−α (satisfies the expression (2)), on the other hand, the optical amplifier 22 operates in ALC mode.

By switching between ALC and AGC according to the expressions (1) and (2), communication with an appropriate SN ratio can be realized. α in the expression (2) is set so as not to immediately switch to the ALC mode when the differential optical power becomes smaller than M, thereby preventing frequent switching between AGC and ALC.

In addition, the monitoring/control unit 23 includes the mode selection result, the ALC mode or the AGC mode, in a monitoring control signal OSC, and sends this signal to the repeater 30 and the receiving station 40.

The repeater 30 has couplers 31 and 34, an optical amplifier 32, and a monitoring/control unit 33. Signal light output from the transmitting station 20 is input to the optical amplifier 32 via the coupler 31. The monitoring control signal OSC output from the transmitting station 20 is input to the monitoring/control unit 33 via the coupler 31. The monitoring/control unit 33 extracts the mode selection result from the monitoring control signal OSC, and outputs this result to the optical amplifier 32 and the coupler 34. The optical amplifier 32 processes the signal light in AGC mode or in ALC mode, depending on the mode selection result given from the monitoring/control unit 33.

The receiving station 40 has a coupler 41, an optical amplifier 42, a monitoring/control unit 43, and an optical demultiplexer 44. Signal light output from the repeater 30 is input to the optical amplifier 42 via the coupler 41. The monitoring control signal OSC output from the repeater 30 is input to the monitoring/control unit 43 via the coupler 41. The monitoring/control unit 43 extracts the mode selection result from the monitoring control signal OSC, and gives it to the optical amplifier 42. The optical amplifier 42 processes the signal light in AGC mode or in ALC mode, depending on the mode selection result given from the monitoring/control unit 43. The optical demultiplexer 44 separates by wavelength the signal light received from the optical amplifier 42, and outputs them to the optical receivers 51 to 53. By transmitting the monitoring control signal OSC to the repeater 30 and the receiving station 40 in this way, the repeater 30 and the receiving station 40 are also capable of switching between AGC and ALC.

As described above, based on a predetermined number of operating wavelengths and expected optical power of signal light to be input to the optical multiplexer 21, the total optical power of signal lights to be input to the optical multiplexer 21 is calculated. Then this total optical power and the optical power of signal lights which have been multiplexed by the optical multiplexer 21 and are to be input to the optical amplifier 22 are compared with each other. With this technique, faults which occur between the input stage of the optical multiplexer 21 and the input stage of the optical amplifier 22 can be monitored, thus making it possible to appropriately switch between AGC and ALC.

The second embodiment is now described with reference to FIG. 4. In the first embodiment, the number of operating wavelengths is fixed and the AGC mode or the ALC mode is selected based on the fixed number of operating wavelengths. In the second embodiment, on the other hand, the number of wavelengths of signal lights to be input to an optical multiplexer is obtained, and the AGC mode or the ALC mode is selected based on the obtained number of wavelengths.

Figure 4:
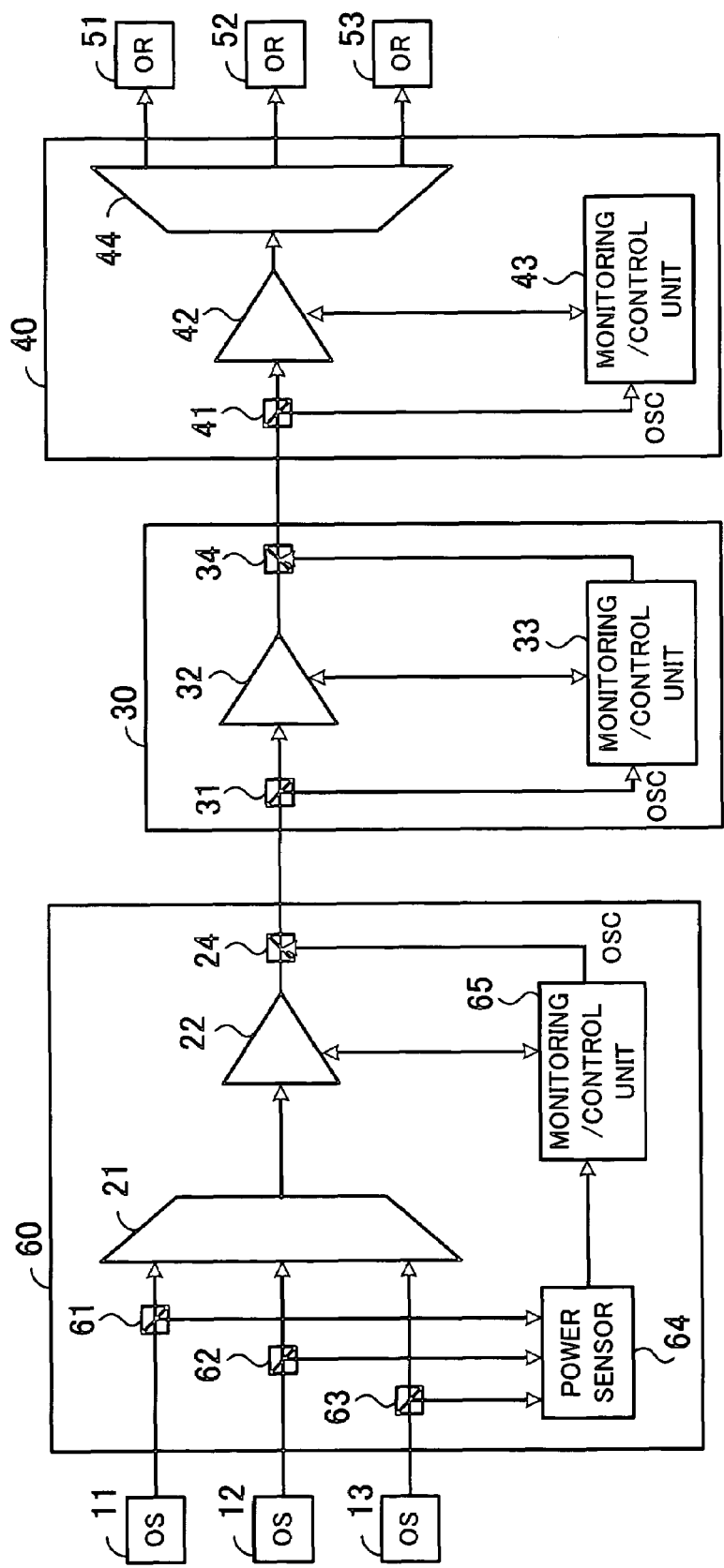
FIG. 4 shows an example of the configuration of an optical communication system according to the second embodiment.

FIG. 4 shows an example of the configuration of an optical communication system according to the second embodiment. The optical communication system of FIG. 4 has couplers 61 to 63 and a power sensor 64, which is different from the optical communication system of FIG. 2. In addition, a monitoring/control unit 65 has a function partly different from that of the monitoring/control unit 23 of FIG. 2. Identical components in FIG. 2 and FIG. 4 have the same reference numerals.

The power sensor 64 receives signal lights output from optical senders 11 to 13 via the couplers 61 to 63. Based on the signal lights from the optical senders 11 to 13, the power sensor 64 detects the number of operating wavelengths to be input to an optical multiplexer 21. Specifically, the power sensor 64 detects the number of signal lights having prescribed optical power or higher, to thereby detect the number of operating wavelengths.

The monitoring/control unit 65 calculates the total optical power of the signal lights to be input to the optical multiplexer 21 based on the number of operating wavelengths detected by the power sensor 64. The monitoring/control unit 65 multiplies expected optical power of each signal light to be input to the optical multiplexer 21 by the number of operating wavelengths detected by the power sensor 64, to thereby calculate the total optical power of the signal lights to be input to the optical multiplexer 21. Then by comparing this total optical power with the optical power of multiplexed signal light to be input to the optical amplifier 22, the ALC mode or the AGC mode is selected.

A condition for the optical amplifier 22 to operate in AGC mode is represented by the expression (3):

$$|10\, \text{Log}(p_{exp}) + 10\, \text{Log}(k) - 10\, \text{Log}(P_{in})| \geq L + M \quad (3)$$

A condition for the optical amplifier 22 to operate in ALC mode is represented by the expression (4):

$$|10\, \text{Log}(p_{exp}) + 10\, \text{Log}(k) - 10\, \text{Log}(P_{in})| < L + M - \alpha \quad (4)$$

$p_{exp}$ is expected optical power for one channel to be input to the optical multiplexer 21. k is the number of operating wavelengths which is detected by the power sensor 64. $P_{in}$ is the optical power of multiplexed signal light to be input to the optical amplifier 22. L is path loss generated between a point where the optical power of signal lights is monitored in the power sensor 64 and the input stage of the optical amplifier 22. M is a system margin for detecting change in the number of operating wavelengths. α is hysteresis. In this connection, $p_{exp}$, L, M, and α are previously stored in a storage unit. In addition, $P_{in}$ can be obtained by a power monitor 22b of the optical amplifier 22.

With respect to the number of wavelengths k, expected total optical power of signal lights to be input to the optical multiplexer 21 is represented by $10\, \text{Log}(p_{exp}) + 10\, \text{Log}(k)$, which is shown by the first and second terms of the left-hand side of the expression (3), (4). By comparing this total optical power with the optical power $10\, \text{Log}(P_{in})$, which is shown by the third term of the left-hand side of the expression (3), (4), of multiplexed signal light to be input to the optical amplifier 22, change in the number of wavelengths between the input stage of the optical multiplexer 21 and the input stage of the optical amplifier 22 can be monitored.

When the absolute value of the differential optical power is equal to or greater than L+M (satisfies the expression (3)), it is recognized that the number of operating wavelengths and the number of wavelengths of signal light to be input to the optical amplifier 22 are different. Or it is recognized that there are signal lights having expected optical power or higher, or expected optical power or lower. In this case, the optical amplifier 22 operates in AGC mode. When the absolute value of the differential optical power is smaller than L+M−α (satisfies the expression (4)), on the other hand, the optical amplifier 22 operates in ALC mode. When $p_{exp}$ is determined with taking the path loss into consideration, L on the right-hand side of the expression (3), (4) is unnecessary.

By switching between ALC and AGC according to the expressions (3) and (4) in this way, communication with an appropriate SN ratio can be realized. Note that α of the expression (4) is provided so as not to immediately switch to the ALC mode when the differential optical power becomes smaller than L+M, thereby preventing frequent switching between ACG and ALC.

As described above, based on the number of operating wavelengths at the input stage of the optical multiplexer 21, which is detected by the power sensor 64, and expected optical power of signal light for each one channel at the input stage of the optical multiplexer 21, the total optical power of signal lights at the input stage of the optical multiplexer 21 is calculated. Then this total optical power is compared with the optical power of signal lights which have been multiplexed by the optical multiplexer 21 and are to be input to the optical amplifier 22. Therefore, faults which occur between the input stage of the optical multiplexer 21 and the input stage of the optical amplifier 22 can be monitored, thus making it possible to appropriately switch between AGC and ALC.

The third embodiment is now described in detail with reference to FIG. 5. In the second embodiment, the number of wavelengths is detected based on the number of signal lights having prescribed optical power or higher, which are to be input to the optical multiplexer, and the total optical power of signal lights to be input to the optical multiplexer is calculated based on the expected optical power of each signal light to be input to the optical multiplexer, in order to select the AGC mode or the ALC mode. In the third embodiment, on the other hand, the total optical power of signal lights to be input to an optical multiplexer is detected by a power sensor, without obtaining the number of wavelengths, and by comparing this total optical power with the optical power of multiplexed signal light at the input stage of an optical amplifier, the AGC mode or the ALC mode is selected.

Figure 5:
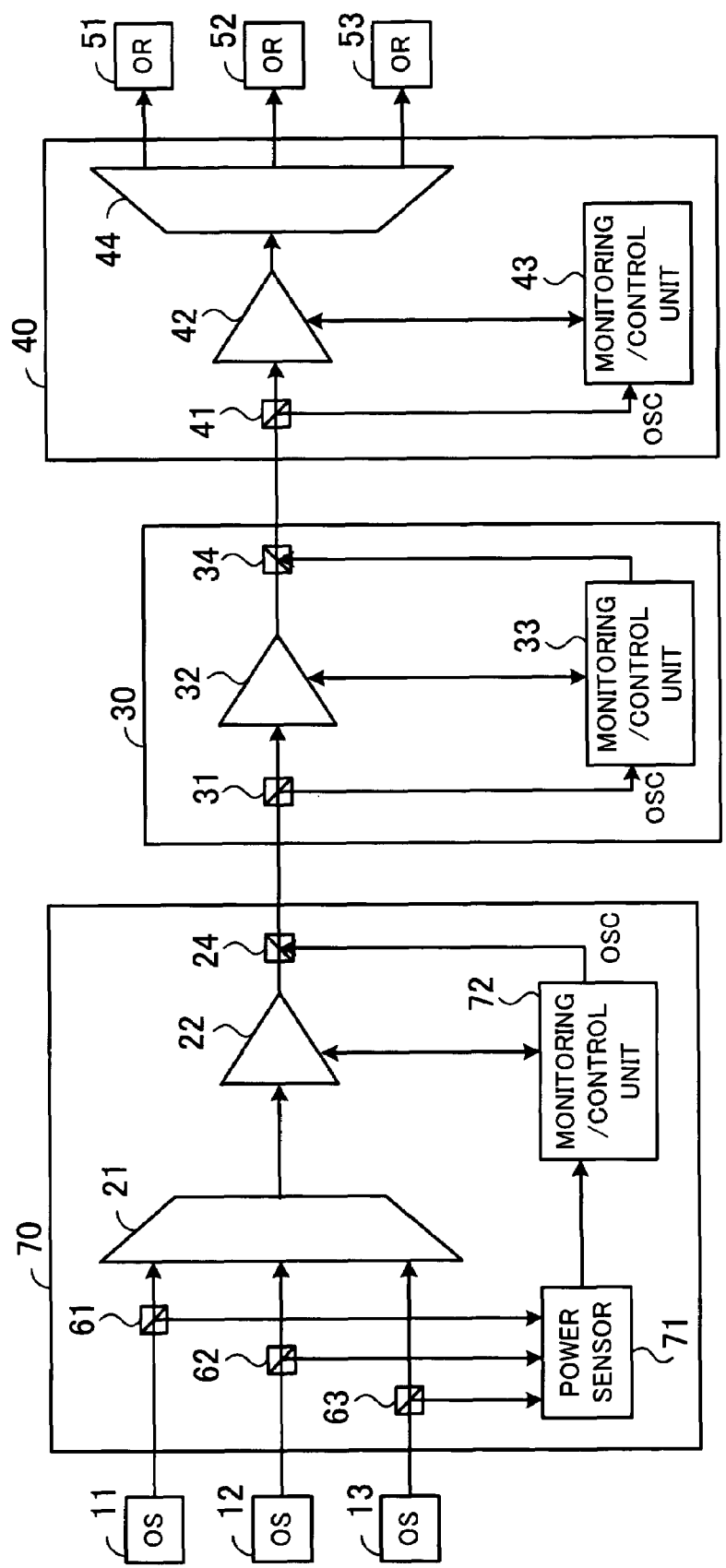
FIG. 5 shows an example of the configuration of an optical communication system according to the third embodiment.

FIG. 5 shows an example of the configuration of an optical communication system according to the third embodiment. In the optical communication system of FIG. 5, a power sensor 71 of a transmitting station 70 and a monitoring/control unit 72 have partly different functions from the power sensor 64 and the monitoring/control unit 65 of FIG. 4, respectively. Identical components in FIG. 4 and FIG. 5 have the same reference numerals.

The power sensor 71 receives signal lights which are output from optical senders 11 to 13, via couplers 61 to 63. The power sensor 71 obtains the optical power of each signal light, which is output from the optical senders 11 to 13, and calculates the total optical power.

The monitoring/control unit 72 compares the total optical power output from the optical senders 11 to 13, which was calculated by the power sensor 71, with the optical power of multiplexed signal light to be input to an optical amplifier 22, and selects the ALC mode or the AGC mode.

A condition for the optical amplifier 22 to operate in AGC mode is represented by the expression (5):

$$|10 \log(\Sigma p_i) - 10 \log(P_{in})| \geq L+M \quad (5)$$

A condition for the optical amplifier 22 to operate in ALC mode is represented by the expression (6):

$$|10 \log(\Sigma p_i) - 10 \log(P_{in})| < L+M-\alpha \quad (6)$$

$P_i$ (i=1 to 3) is optical power output from an optical sender 11 to 13, which is to be input to the optical multiplexer 21. That is, $\Sigma p_i$ is the total optical power of signal lights at the input stage of the optical multiplexer 21. $P_{in}$ is the optical power of signal light to be input to the optical amplifier 22. L is path loss generated between a point where the optical power of signal lights is monitored in the power sensor 71 and the input stage of the optical amplifier 22. M is a system margin for detecting change in the number of operating wavelengths. α is hysteresis. In this connection, L, M, and α are previously stored in a storage unit. In addition, $P_{in}$ can be obtained by a power monitor 22b of the optical amplifier 22.

The total optical power of signal lights at the input stage of the optical multiplexer 21 is represented by 10 $\log(\Sigma p_i)$, which is shown by the first term of the left-hand side of the expression (5), (6). By comparing this total optical power with the optical power 10 $\log(P_{in})$ of multiplexed signal light to be input to the optical amplifier 22, change in the number of wavelengths between the input stage of the optical multiplexer 21 and the input stage of the optical amplifier 22 can be monitored.

When the absolute value of the differential optical power is equal to or greater than L+M (satisfies the expression (5)), it is recognized that the number of operating wavelengths and the number of wavelengths of signal light to be input to the optical amplifier 22 are different. Or it is recognized that there are signal lights having expected optical power or higher, or expected optical power or lower. In this case, the optical amplifier 22 operates in AGC mode. When the absolute value of the differential optical power is smaller than L+M−α (satisfies the expression (6)), on the other hand, the optical amplifier 22 operates in ALC mode.

By switching between ALC and AGC according to the expressions (5) and (6) in this way, communication with an appropriate SN ratio can be realized. α in the expression (6) is provided so as not to immediately switch to the ALC mode when the differential optical power becomes smaller than L+M, thereby preventing frequent switching between AGC and ALC.

As described above, the total optical power of signal lights to be input to the optical multiplexer 21 is obtained by the power sensor 71, and this total optical power is compared with the optical power of multiplexed signal light at the input stage of the optical amplifier 22 to select the AGC mode or the ALC mode. Therefore, without providing a spectrum analyzer, faults which occur between the input stage of the optical multiplexer 21 and the input stage of the optical amplifier 22 can be monitored, thus making it possible to appropriately switch between AGC and ALC.

The fourth embodiment is now described in detail with reference to FIG. 6. In the fourth embodiment, constant optical power is maintained for signal lights to be input to an optical multiplexer. Then the AGC mode or the ALC mode is selected by using as expected optical power the constant optical power of the signal lights to be maintained.

Figure 6:
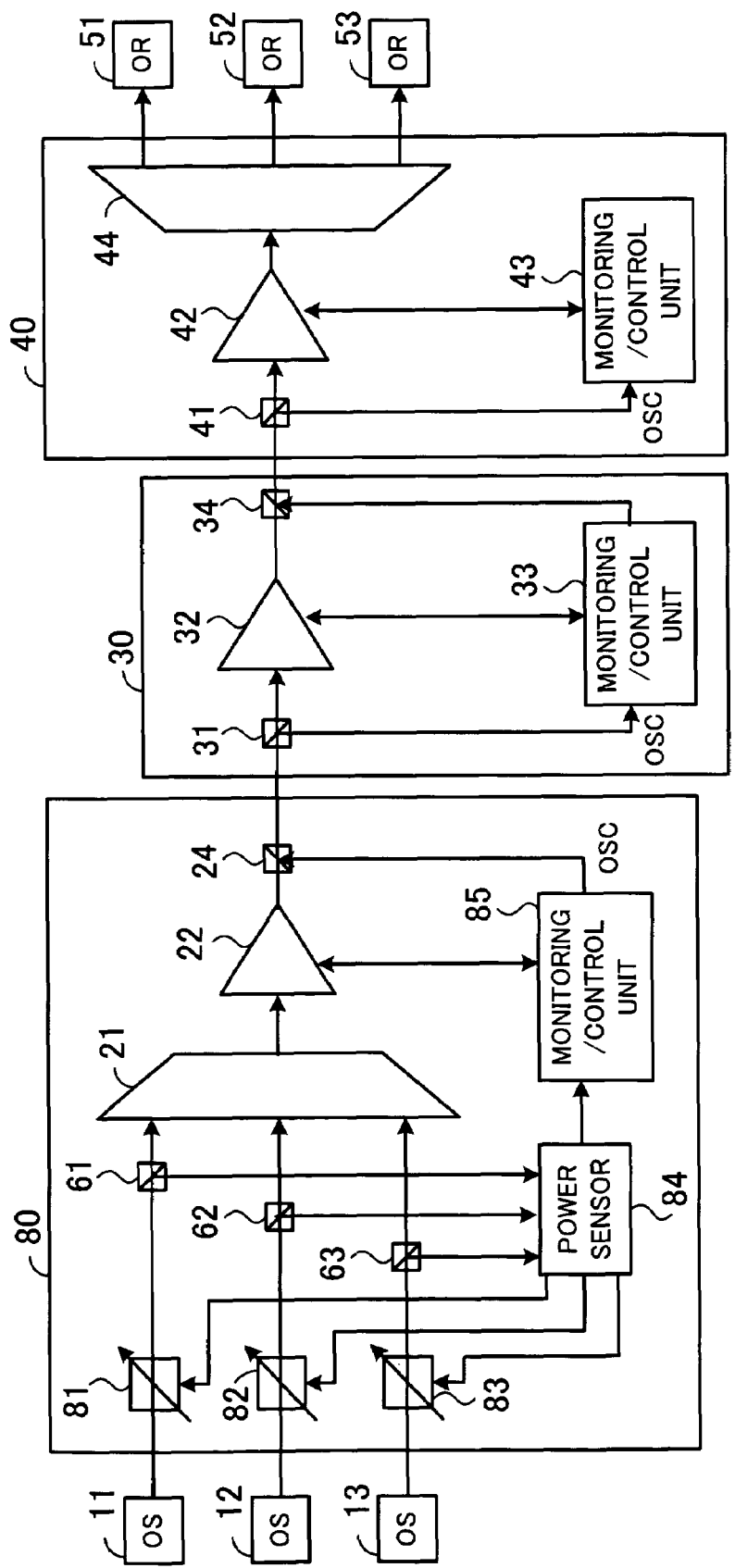
FIG. 6 shows an example of the configuration of an optical communication system according to the fourth embodiment.

FIG. 6 shows an example of the configuration of an optical communication system according to the fourth embodiment. Identical components in FIG. 5 and FIG. 6 have the same reference numerals.

Referring to FIG. 6, VOAs 81 to 83 are provided at the input stage of the transmitting station 80. The VOAs 81 to 83 attenuate signal lights output from optical senders 11 to 13 under the control of a power sensor 84, and output the resultant to an optical multiplexer 21 via couplers 61 to 63.

The power sensor 84 receives signal lights from the VOAs 81 to 83 via the couplers 61 to 63. The power sensor 84 monitors the optical power of signal lights output from the VOAs 81 to 83, and controls the VOAs 81 to 83 to maintain constant optical power for signal lights to be output. In addition, the power sensor 84 obtains the number of operating wavelengths based on the received signal lights. Specifically, the power sensor 84 detects the number of signal lights having prescribed optical power or higher, to thereby obtain the number of operating wavelengths.

A monitoring/control unit 85 calculates the total optical power of signal lights to be input to the optical multiplexer 21, based on the number of operating wavelengths detected by the power sensor 84. Specifically, the monitoring/control unit 85 multiplies the expected optical power of each signal light to be input to the optical multiplexer 21 by the number of operating wavelengths detected by the power sensor 84, to calculate the total optical power of the signal lights to be input to the optical multiplexer 21. This total optical power is compared with the optical power of multiplexed signal light to be input to the optical amplifier 22 to thereby select the ALC mode or the AGC mode. In this connection, the expected optical power means constant optical power to be maintained by the VOAs 81 to 83.

A condition for the optical amplifier 22 to operate in AGC mode is represented by the expression (7):

$$|10\,\mathrm{Log}(\Sigma p_i) + 10\,\mathrm{Log}(k) - 10\,\mathrm{Log}(P_{in})| \geq L + M \qquad (7)$$

A condition for the optical amplifier 22 to operate in ALC mode is represented by the expression (8):

$$|10\,\mathrm{Log}(p_i) + 10\,\mathrm{Log}(k) - 10\,\mathrm{Log}(P_{in})| < L + M - \alpha \qquad (8)$$

$p_i$ is expected optical power of signal light to be input to the optical multiplexer 21. k is the number of operating wavelengths detected by the power sensor 84. $P_{in}$ is the optical power of signal light to be input to the optical amplifier 22. L is path loss generated between a point where the optical power of signal lights is monitored in the power sensor 84 and the input stage of the optical amplifier 22. M is a system margin for detecting change in the number of operating wavelengths. $\alpha$ is hysteresis.

In this connection, $p_i$, L, M and $\alpha$ are previously stored in a storage unit. $P_{in}$ can be obtained by a power monitor 22b of the optical amplifier 22. In addition, $p_i$ can be determined with taking the path loss generated between the input stage of the optical multiplexer 21 and the input stage of the optical amplifier 22 into consideration. This is because the path loss can be calculated in designing this system. When $p_i$ is determined with taking the path loss into consideration, L in the right-hand side of the expression (7), (8) is unnecessary.

With respect to the number of wavelengths k, expected total optical power of signal lights to be input to the optical multiplexer 21 is represented by 10 Log($p_i$)+10 Log(k), which is shown by the first and second terms of the left-hand side of the expression (7), (8). By comparing this expected total optical power with the optical power 10Log($P_{in}$), which is shown by the third term of the left-hand side of the expression (7), (8), of multiplexed signal light to be input to the optical amplifier 22, change in the number of wavelengths between the input stage of the optical multiplexer 21 and the input stage of the optical amplifier 22 can be monitored.

When the absolute value of the differential optical power is equal to or greater than L+M (satisfies the expression (7)), it is recognized that the number of operating wavelengths and the number of wavelengths of signal light to be input to the optical amplifier 22 are different. Or it is recognized that there are signal lights having expected optical power or higher, or expected optical power or lower. In this case, the optical amplifier 22 operates in AGC mode. When the absolute value of the differential optical power is smaller than L+M−$\alpha$ (satisfies the expression (8)), on the other hand, the optical amplifier 22 operates in ALC mode.

By switching between ALC and AGC according to the expressions (7) and (8) in this way, communication with an appropriate SN ratio can be realized. $\alpha$ in the expression (8) is provided so as not to immediately switch to the ALC mode when the differential optical power becomes smaller than L+M, thereby preventing frequent switching between AGC and ALC.

As described above, the VOAs 81 to 83 are controlled to maintain expected optical power for signal lights to be input to the optical multiplexer 21. Then the expected optical power is multiplied by the number of operating wavelengths to calculate the total optical power of signal lights at the input stage of the optical multiplexer 21. Then by comparing this total optical power with the optical power at the input stage of the optical amplifier 22, the AGC mode or the ALC mode is selected. Thus, without providing a spectrum analyzer, faults which occur between the input stage of the optical multiplexer 21 and the input stage of the optical amplifier 22 can be monitored, thus making it possible to appropriately switch between AGC and ALC.

Figure 7:
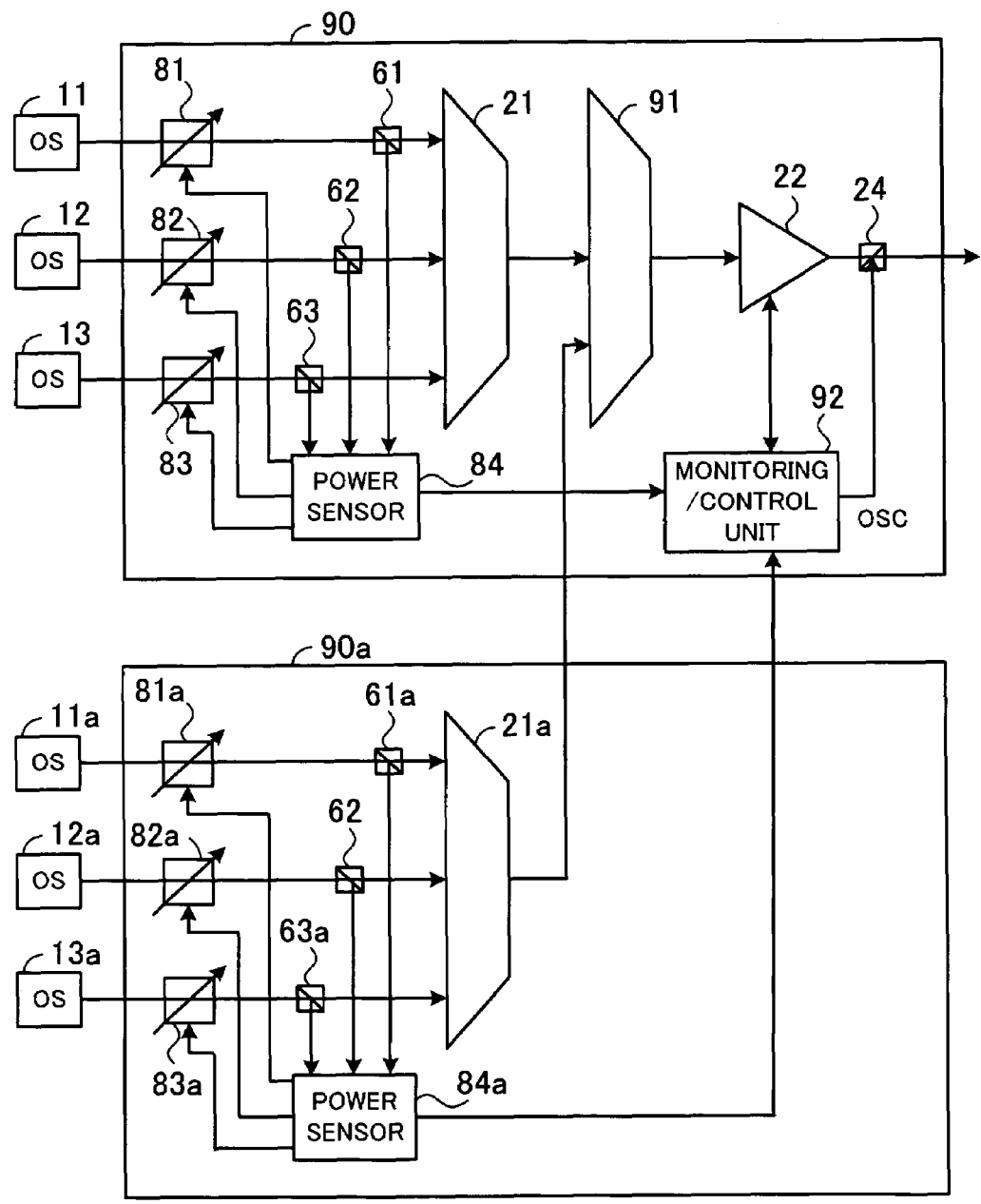
FIG. 7 shows an example of the configuration of an optical communication system according to the fifth embodiment.
Figure 8:
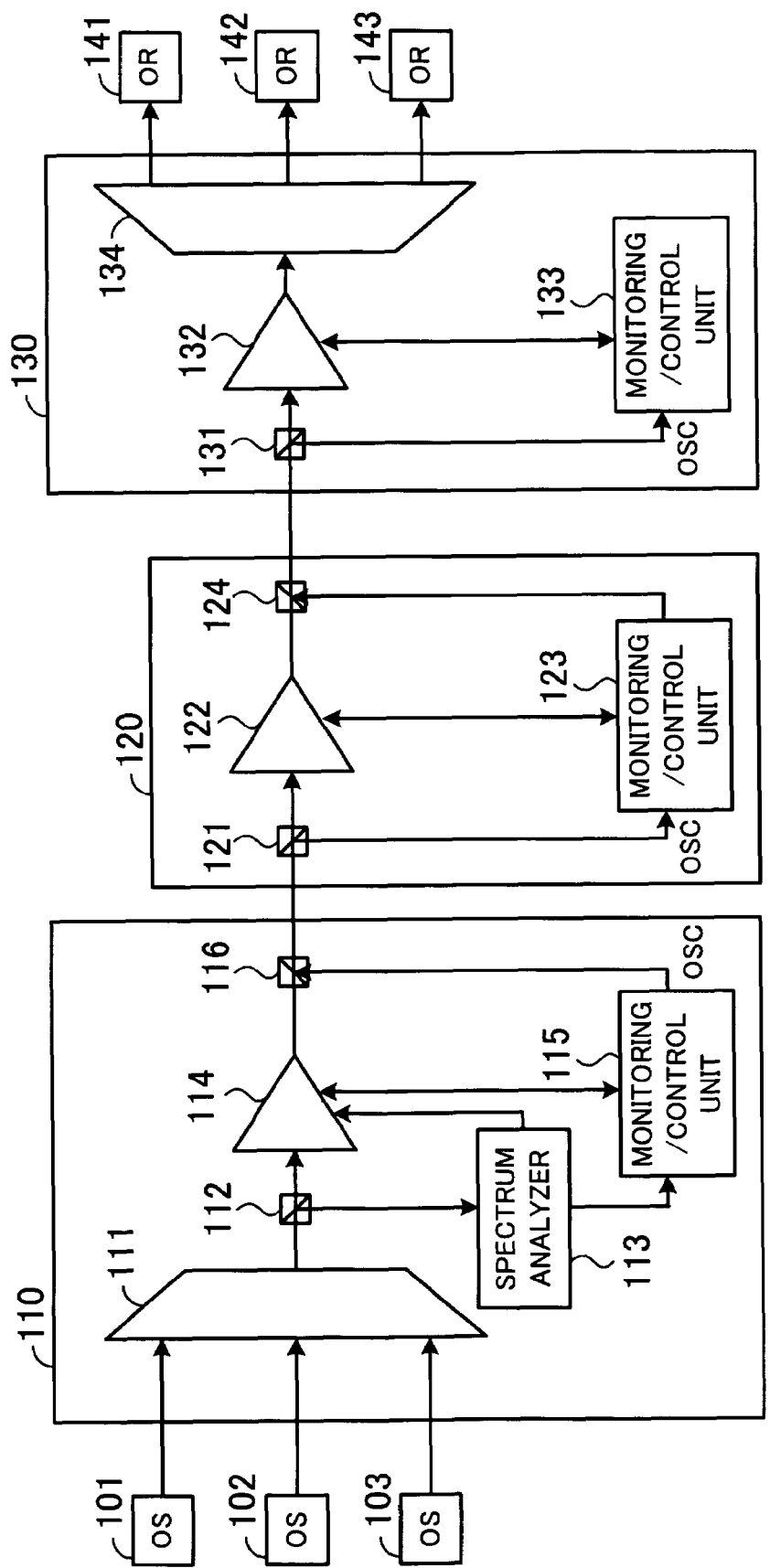
FIG. 8 is a block diagram of a conventional optical communication system.
Figure 9:
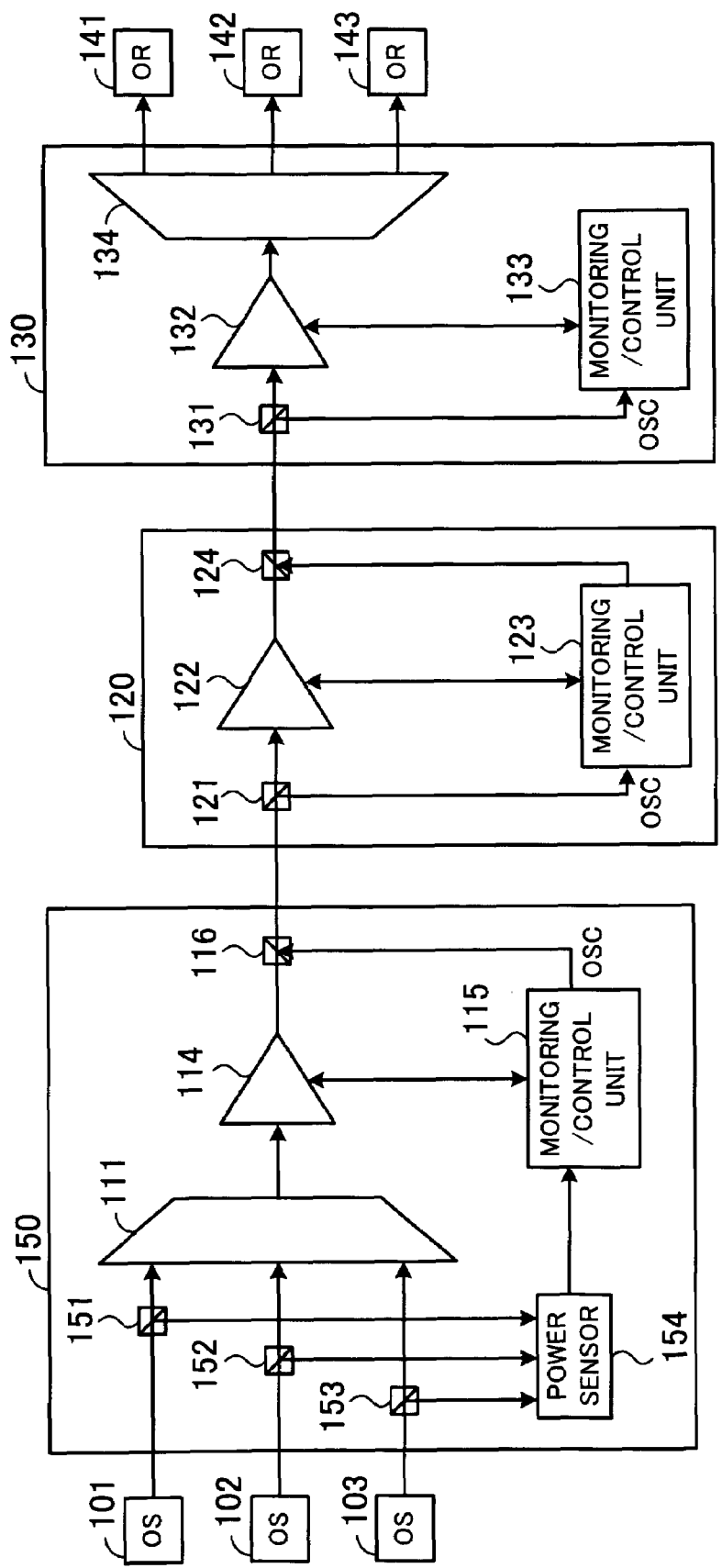
FIG. 9 is a block diagram of a conventional optical communication system that monitors the optical power at the input of an optical multiplexer without a spectrum analyzer.

The fifth embodiment is now described in detail with FIG. 7. In this fifth embodiment, a transmitting station, which is shown in the fourth embodiment, is cascade-connected.

FIG. 7 shows an example of the configuration of an optical communication system according to the fifth embodiment. Identical components in FIG. 6 and FIG. 7 have the same reference numerals. Note that the repeater 30 and the receiving station 40 of FIG. 6 are not illustrated in FIG. 7.

In addition to the system of FIG. 6, an optical multiplexer 91 is provided in FIG. 7. The optical multiplexer 91 receives multiplexed signal light output from an optical multiplexer 21 and multiplexed signal light output from another transmitting station 90a. The optical multiplexer 91 further combines the multiplexed signal light produced in the own transmitting station 90 and the multiplexed signal light produced in the transmitting station 90a, and outputs the resultant to an optical amplifier 22. Although only one transmitting station is shown as another transmitting station in FIG. 7, a plurality of transmitting stations may be provided. In this case, the optical multiplexer 91 receives multiplexed signal lights from the plurality of transmitting stations.

Optical senders 11a to 13a output signal lights to the transmitting station 90a. The transmitting station 90a has VOAs 81a to 83a, couplers 61a to 63a, an optical multiplexer 21a, and a power sensor 84a, which are identical to the VOAs 81 to 83, the couplers 61 to 63, the optical multiplexer 21, and the power sensor 84 of the transmitting station 90. Similarly to the power sensor 84, the power sensor 84a of the transmitting station 90a monitors the optical power of signal lights to be input to the optical multiplexer 21a, and controls the VOAs 81a to 83a to maintain constant optical power. In addition, the power sensor 84a obtains the number of operating wavelengths based on the received signal lights. Specifically, the power sensor 84a detects the number of signal lights having prescribed optical power or higher, to thereby detect the number of operating wavelengths. The power sensor 84a then gives the detected number of operating wavelengths to the monitoring/control unit 92 of the transmitting station 90.

The monitoring/control unit 92 of the transmitting station 90 is notified of the number of operating wavelengths from each power sensor 84, 84a. In addition, the monitoring/control unit 92 is notified of the optical power of multiplexed signal light to be input to the optical amplifier 22. The optical power of the multiplexed signal light to be input to the optical amplifier 22 can be obtained by means of a power monitor 22b that is shown in FIG. 3.

The monitoring/control unit 92 calculates the total optical power of signal lights to be input to the optical multiplexers 21 and 21a, based on the number of operating wavelengths detected by the power sensors 84 and 84a. Specifically, the monitoring/control unit 92 multiplies expected optical power of each signal light to be input to the optical multiplexers 21 and 21a by the number of operating wavelengths detected by the power sensors 84 and 84a, to thereby calculate the total optical power of signal lights to be input to the optical multiplexers 21 and 21a. Then the total optical power is compared with the optical power of multiplexed signal light to be input to the optical amplifier 22, to thereby select the ALC mode or the AGC mode. In this connection, the expected optical power means the constant optical power to be maintained by the VOAs 81 to 83 and 81a to 83a.

A condition for the optical amplifier 22 to operate in AGC mode is represented by the expression (9):

$$|10\ \text{Log}(p_i)+10\ \text{Log}(k)-10\ \text{Log}(P_{in})| \geq L+M \tag{9}$$

A condition for the optical amplifier 22 to operate in ALC mode is represented by the expression (10):

$$|10\ \text{Log}(p_i)+10\ \text{Log}(k)-10\ \text{Log}(P_{in})| < L+M-\alpha \tag{10}$$

$p_i$ is expected optical power of signal light to be input to the optical multiplexers 21 and 21a. k is the number of operating wavelengths detected by the power sensors 84 and 84a. $P_{in}$ is the optical power of signal light to be input to the optical amplifier 22. L is path loss generated between a point where the optical power of signal lights is monitored in the power sensor 84, 84a and the input stage of the optical amplifier 22. M is a system margin for detecting change in the number of operating wavelengths. α is hysteresis.

In this connection, $p_i$, L, M and α are previously stored in a storage unit. $P_{in}$ can be obtained by a power monitor 22b of the optical amplifier 22. In addition, $p_i$ can be determined with taking the path loss generated between the input stage of the optical multiplexer 21 and the input stage of the optical amplifier 22 into consideration. This is because the path loss can be calculated in designing this system. When $p_i$ is determined with taking the path loss into consideration, L in the right-hand side of the expression (9), (10) is unnecessary.

With respect to the number of wavelengths k, the expected total optical power of signal lights to be input to the optical multiplexers 21 and 21a is represented by 10 Log($p_i$)+10 Log(k), which is shown by the first and second terms of the left-hand side of the expression (9), (10). By comparing this expected total optical power with the optical power 10 Log ($P_{in}$), which is shown by the third term of the left-hand side of the expression (9), and (10), of multiplexed signal light to be input to the optical amplifier 22, change in the number of wavelengths between the input stages of the optical multiplexers 21 and 21a and the input stage of the optical amplifier 22 can be detected.

When the absolute value of the differential optical power is equal to or greater than L+M (satisfies the expression (9)), it is recognized that the number of operating wavelengths and the number of wavelengths of signal light to be input to the optical amplifier 22 are different. Or it is recognized that there are signal lights having expected optical power or higher, or expected optical power or lower. In this case, the optical amplifier 22 operates in AGC mode. When the absolute value of the differential optical power is smaller than L+M−α (satisfies the expression (10)), on the other hand, the optical amplifier 22 operates in ALC mode.

By switching between ALC and AGC according to the expressions (9) and (10) in this way, communication with an appropriate SN ratio can be realized. α in the expression (10) is provided so as not to immediately switch to the ALC mode when the differential optical power becomes smaller than L+M, thereby preventing frequent switching between AGC and ALC.

As described above, the VOAs 81 to 83 and 81a to 83a are controlled to maintain expected optical power for signal lights to be input to the optical multiplexers 21 and 21a. Then the expected optical power is multiplied by the number of operating wavelengths to thereby calculate the total optical power at the input stages of the optical multiplexers 21 and 21a. Based on this total optical power and the optical power at the input stage of the optical amplifier 22, the AGC mode or the ALC mode is selected. Thus, without providing a spectrum analyzer, faults which occur between the input stages of the optical multiplexers 21 and 21a and the input stage of the optical amplifier 22 can be monitored, thus making it possible to appropriately switching between AGC and ALC.

According to this invention, a transmission apparatus is designed to select automatic gain control or automatic level control for an optical amplifier based on the total optical power of a plurality of signal lights to be input to an optical multiplexer and the optical power of multiplexed signal light. Thus, without providing a spectrum analyzer, faults which occur between the input stages of the optical multiplexer and the input stage of the optical amplifier can be monitored, thus making it possible to appropriately switch between the automatic gain control and the automatic level control.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission apparatus for multiplexing and transmitting a plurality of signal lights, comprising:
   optical multiplexer for multiplexing wavelengths of the plurality of signal lights and outputting wavelength multiplexed signal lights;
   optical amplifier being connected at an output a latter stage of the optical multiplexer for operating in one of automatic gain control mode and automatic level control mode, the automatic gain control mode maintaining a constant gain for the wavelength-multiplexed signal lights, the automatic level control mode maintaining constant output power for the wavelength-multiplexed signal lights; and
   mode selecting means for selecting the one of the automatic gain control mode and the automatic level control mode for the optical amplifier based on total optical power of the plurality of signal lights before being subjected to the wavelength multiplexing of the optical multiplexer and optical power of the wavelength-multiplexed signal lights resulting from the multiplexing of the optical multiplexer.

2. The transmission apparatus according to claim 1, wherein the mode selecting means calculates the total optical power by multiplying expected optical power for one channel of the plurality of signal lights to be input to the optical multiplexer by the number of the plurality of signal lights to be input to the optical multiplexer, the number of the plurality of signal lights being previously stored in a storage unit.

3. The transmission apparatus according to claim 1, further comprising signal light sensing means for detecting the number of the plurality of signal lights to be input to the optical multiplexing means based on optical power of the plurality of signal lights to be input the optical multiplexing means, wherein the mode selecting means calculates the total optical power by multiplying expected optical power for one channel of the plurality of signal lights to be input to the optical multiplexing means by the number of the plurality of signal lights.

4. The transmission apparatus according to claim 1, wherein the mode selecting means calculates the total optical power by detecting optical power of each of the plurality of signal lights to be input to the optical multiplexing means.

5. The transmission apparatus according to claim 1, further comprising:
   optical power control means for maintaining constant optical power for each of the plurality of signal lights to be input to the optical multiplexing means;
      optical power storage means for storing a value of the constant optical power to be maintained by the optical power control means; and
      signal light sensing means for detecting the number of the plurality of signal lights to be input to the optical multiplexing means,
      wherein the mode selecting means calculates the total optical power by multiplying the value being stored in the optical power storage means by the number of the plurality of signal lights detected by the signal light sensing means.

6. The transmission apparatus according to claim 1, further comprising multiplexed-light multiplexing means for multiplexing first wavelengths of the wavelength-multiplexed signal light produced by the optical multiplexing means and second wavelengths of another wavelength-multiplexed signal light produced by another optical multiplexing means of another transmission apparatus.

7. The transmission apparatus according to claim 1, wherein the mode selecting means selects the automatic gain control for the optical amplifier when a difference between the total optical power and the optical power of the wavelength-multiplexed signal light is equal to or is greater than a prescribed value.

8. The transmission apparatus according to claim 1, wherein the mode selecting means selects the automatic level control for the optical amplifier when a difference between the total optical power and the optical power of the wavelength-multiplexed signal light is smaller than a prescribed value.

9. The transmission apparatus according to claim 1, further comprising a selection result transmitting means for transmitting a selection result obtained by the mode selecting means to a repeater and a receiving station.

10. An optical communication system for multiplexing and transmitting a plurality of signal lights, comprising:
   a transmitting station having
      optical multiplexer for multiplexing wavelengths of the plurality of signal lights and outputting wavelength multiplexed signal lights,
      optical amplifier being connected at an output stage of the optical multiplexer for operating in one of automatic gain control mode and automatic level control mode, the automatic gain control mode maintaining a constant gain for wavelength-multiplexed signal lights, the automatic level control mode maintaining constant output power for the wavelength-multiplexed signal lights,
      mode selecting means for selecting the one of the automatic gain control mode and the automatic level control mode for the optical amplifier based on total optical power of the plurality of signal lights before being subjected to the wavelength multiplexing of the optical multiplexer and optical power of the wavelength-multiplexed signal lights, and
      selection result transmitting means for transmitting a selection result obtained by the mode selecting means;
   a repeater having
      selection result transmitting and receiving means for transmitting and receiving the selection result from the transmitting station, and
      repeater optical amplifier for operating in the one of the automatic gain control and the automatic level control, based on the selection result; and
   a receiving station having
      selection result receiving means for receiving the selection result from the repeater,
      receiving-station optical amplifier for operating in the one of the automatic gain control and the automatic level control based on the selection result, and
      optical demultiplexing means for separating the wavelength-multiplexed signal lights by wavelength.

* * * * *